United States Patent
Manesh et al.

(10) Patent No.: US 12,359,372 B2
(45) Date of Patent: Jul. 15, 2025

(54) CATALYST FREE ORGANOSOLV PROCESS, SYSTEM AND METHOD FOR FRACTIONATION OF LIGNOCELLULOSIC MATERIALS AND BIOPRODUCTS RECOVERY

(71) Applicant: American Science and Technology, Chicago, IL (US)

(72) Inventors: Ali Manesh, Chicago, IL (US); Raghu N Gurram, Wausau, WI (US); Edwin G Zoborowski, Wausau, WI (US); Jordan A Thut, Wausau, WI (US); Joseph F Kelley, Wausau, WI (US)

(73) Assignee: American Science and Technology, Chicago, IL (US)

( * ) Notice: Subject to any disclaimer, the term of this patent is extended or adjusted under 35 U.S.C. 154(b) by 372 days.

(21) Appl. No.: 17/095,594

(22) Filed: Nov. 11, 2020

(65) Prior Publication Data

US 2021/0292968 A1    Sep. 23, 2021

Related U.S. Application Data

(60) Provisional application No. 62/934,840, filed on Nov. 13, 2019.

(51) Int. Cl.
*D21C 11/10*    (2006.01)
*C07G 1/00*    (2011.01)
(Continued)

(52) U.S. Cl.
CPC ............. *D21C 11/10* (2013.01); *C07G 1/00* (2013.01); *C08H 6/00* (2013.01); *D21C 3/20* (2013.01)

(58) Field of Classification Search
CPC . D21C 3/20; D21C 11/10; C07G 1/00; C08H 6/00
See application file for complete search history.

(56) References Cited

U.S. PATENT DOCUMENTS 9,382,283 B2 * 7/2016 Manesh ................. D21C 1/00
2010/0159522 A1 * 6/2010 Cirakovic ............. C12P 19/14
536/128

(Continued)

*Primary Examiner* — Abbas Rashid
*Assistant Examiner* — Elisa H Vera
(74) *Attorney, Agent, or Firm* — Dunlap Codding, P.C.

(57) ABSTRACT

A catalyst free organosolv process for a more efficient delignification and bio-product production by fractionating lignocellulosic materials comprises of providing one or more lignin dissolving chemicals with water and placing it in contact with lignocellulosic biomass. The process also includes producing used solvent as a result of placing biomass in contact with lignin dissolving chemicals and water, separating it into organic and aqueous layers, extracting poly lignin from the organic layer to produce recyclable lignin dissolving chemicals, and extracting dissolved solid from the aqueous layer to produce recyclable water. The catalyst free organosolv process can use any combination of fresh, used, or recyclable water and lignin dissolving chemicals, with or without any pH adjustment and placing them in contact with any biomass in process, or any new biomass. The recyclable lignin dissolving chemicals can be further separated to remove any excess or desired organic chemicals from it. The separated chemicals can be recycled as new lignin dissolving solvent or sold, while poly lignin can be used as a natural and renewable colorant for other polymers such as poly lactic acid, or can be mixed with other polymers as an additive and be compounded, co-extruded, injected to make consumable polymeric parts, or can be used as a natural source of renewable aromatics. Application of the catalyst free organosolv process helps to preserve fiber strength which is important for certain applications. At the (Continued)

Process Flow Diagram, Organosolv Based Cellulosic Bio-Fuel and Other Products end, the catalyst free organosolv fractionation process produces good quality fibers, various organic chemicals, and poly lignin that together make the process very economically attractive.

26 Claims, 9 Drawing Sheets

(51) Int. Cl.
*C08H 7/00* (2011.01)
*D21C 3/20* (2006.01)

(56) References Cited

U.S. PATENT DOCUMENTS

2016/0031921 A1* 2/2016 Manesh .................. D21C 1/00
524/72
2016/0076112 A1* 3/2016 Cai ........................ D21C 3/222
549/429

* cited by examiner

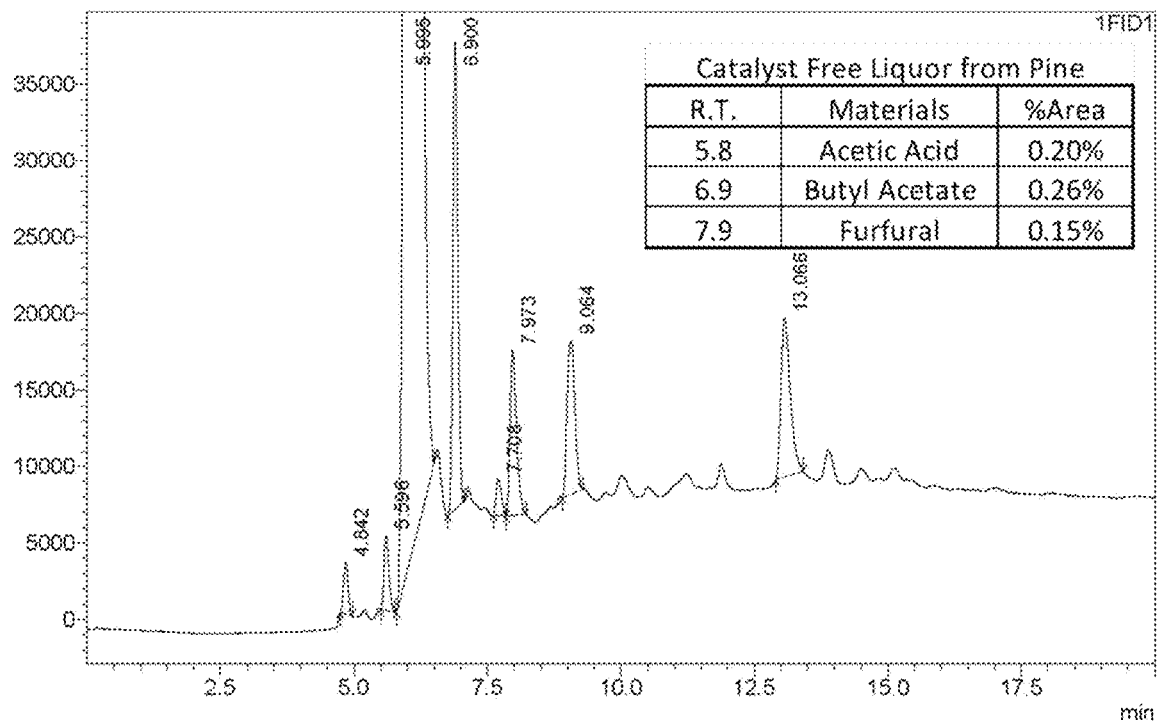
Pine Fibers after Catalyst Free Organosolv Process Process
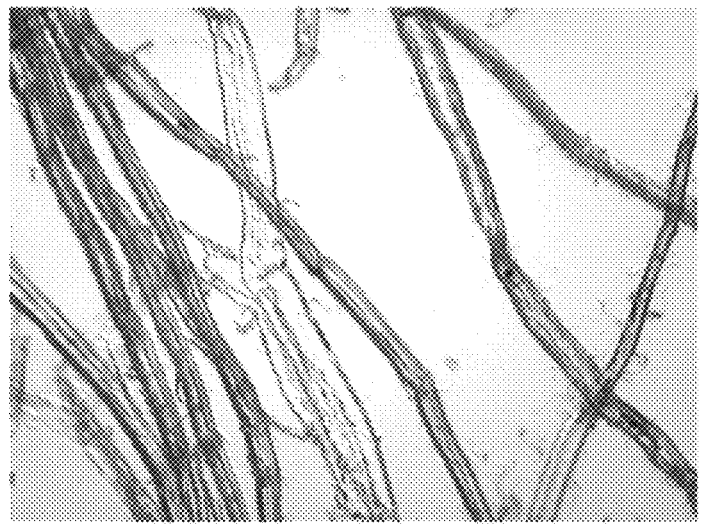
Fig 6, Typical Catalyst Free Organosolv process products

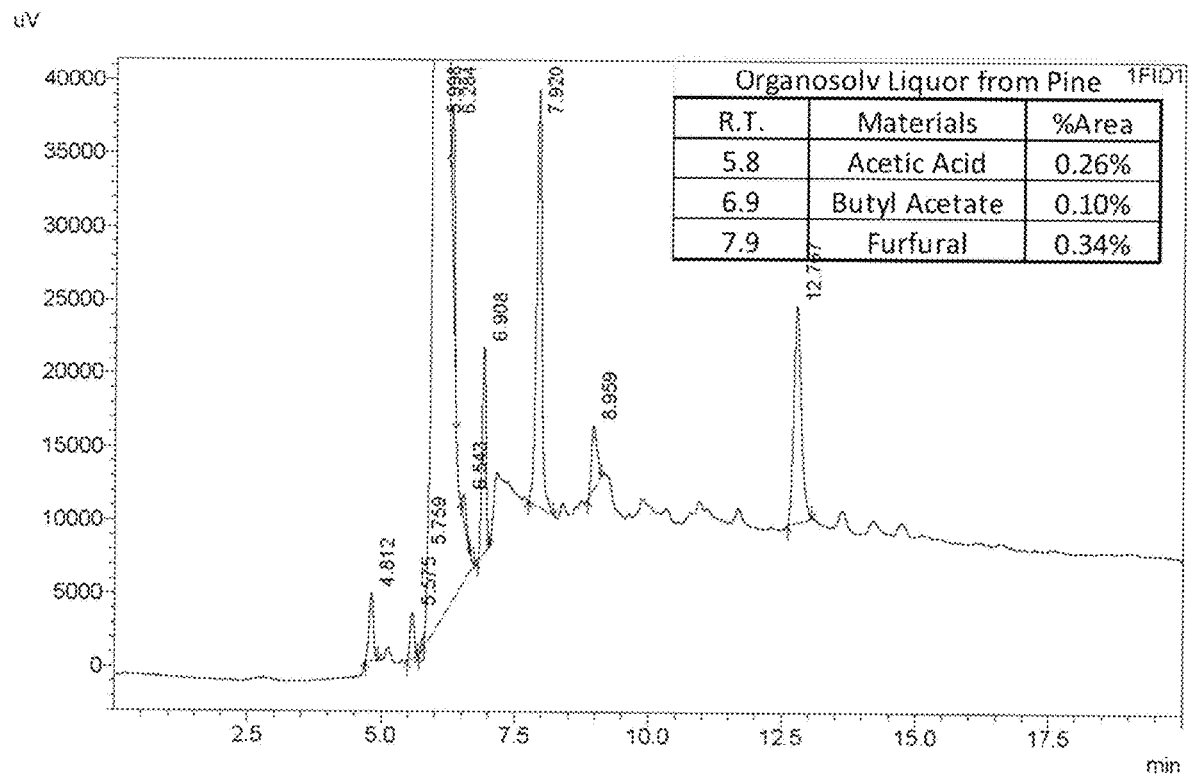
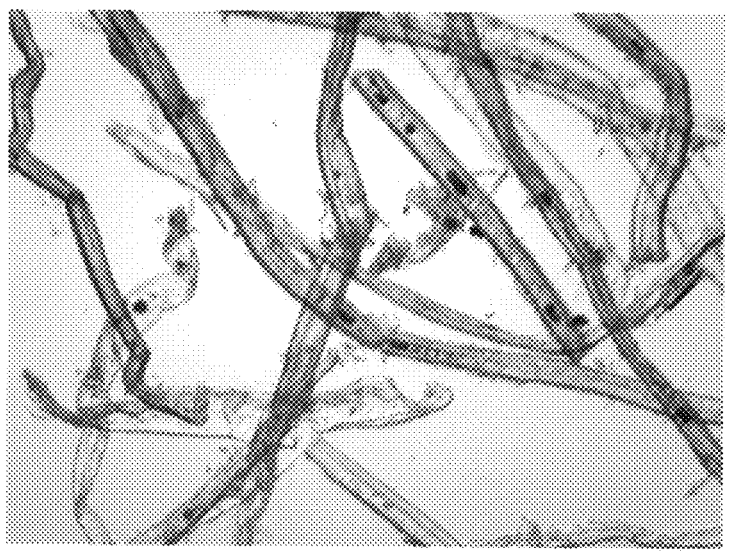
Fig 7, Typical products from traditional Organosolv process

CATALYST FREE ORGANOSOLV PROCESS, SYSTEM AND METHOD FOR FRACTIONATION OF LIGNOCELLULOSIC MATERIALS AND BIOPRODUCTS RECOVERY

CROSS REFERENCE TO RELATED APPLICATION

This application claims the full benefit and priority of provisional application No. 62/934,840, filed Nov. 13, 2020, entitled "CATALYST FREE ORGANOSOLV PROCESS, SYSTEM AND METHOD FOR FRACTIONATION OF LIGNOCELLULOSIC MATERIALS AND BIOPRODUCTS RECOVERY". The entire contents of this application is incorporated herein by reference.

COPYRIGHT STATEMENT

A portion of the disclosure of this document contains material subject to copyright protection. No objection is made to facsimile reproduction of the patent document or this disclosure as it appears in the Patent and Trademark Office files or records, but otherwise any and all rights, including copyright(s), are reserved.

FIELD

The subject matter and invention herein is generally directed to delignification and fractionation of a lignocellulosic biomass using organosolv processes, particularly to such organosolv processes that use any lignin dissolving chemicals such as organic solvents without any added catalysts to remove lignin from lignocellulosic biomass. The inventive process generates additional lignin dissolving solvents during fractionation that can be used as more lignin dissolving solvent, and placed in contact with more lignocellulosic biomass for additional delignification processes, which will separate lignin and other dissolved solids from the lignin dissolving solvent before or after the solvent is completely saturated with lignin and other dissolved solids.

INTRODUCTION

This section provides some introduction to various matters relating to the invention mentioned herein, but it should be understood that this should not be construed as prior art to the invention; certain materials may be included, referenced, or alluded to in this section that may be inventions of the inventors noted herein. This section is simply included to include some introduction for the sake of the reader, some of which may be background to the invention, and some which is not.

In industrial paper-making processes, organosolv is a pulping technique that uses an organic solvent to solubilize lignin and hemicellulose.

Several attempts have been made to apply an organosolv fractionation process that recycles certain chemicals from lignin dissolving solvent used to delignify lignocellulosic materials and produce solid cellulose or fiber or pulp for paper and paper related products' applications, or hydrolysis of cellulose to make C6 sugar that can be converted to renewable chemicals, biofuels and other sugar based products. One of the major drawbacks for this type of fractionation process is that solvent recovery may be limited, which directly affects the economic feasibility of the process. Therefore, there exists a need for a system that can maintain or regenerate lignin dissolving solvent during a delignification process to increase its economic viability.

Another economic drawback is that the cost of the fractionation of biomass typically is higher than the financial benefits realized from producing cellulose fiber alone. In other words, to have a profitable process, the process should be optimized such that nearly all of the biomass is used up, ideally with a near zero waste, while producing high value and marketable products including high quality pulp for fiber applications. Thus, a desire exists to provide an organosolv process that can readily produce different and more classes of bio-chemicals during a fractionation process.

Yet another drawback of the prior arts, is the cost of separation of any particular lignin dissolving solvent from the mixture of various chemicals that are produced during lignocellulosic fractionation process that can be used for the next cycle. Thus, a desire exists to provide an organosolv process that lignin dissolving solvent is not a single chemical that requires an expensive operation for recovery and recycling can readily reproduce itself during fractionation process, can remove more lignin from lignocellulosic biomass, and results in a good quality fiber for pulp using industries.

In addition, since traditional organosolv processes are using some type of acid as a catalyst to break cellulosic chains and allows more lignin to be taken away, it has a tendency to produce fibers that may be shorter in length, when compared with other pulps made using other prior arts. While shorter length fibers are good for some applications such as cellulosic sugar production, they are less desirable for some other applications such as manufacturing cardboard for packaging, due to their low strength. Therefore, for certain applications, a desire exists to provide an organosolv process that can remove the maximum amount of lignin, but also produce pulps with the maximum fiber length and strength for general applications.

SUMMARY OF THE INVENTION

Certain deficiencies mentioned above may be resolved by the organosolv fractionation process that does not use any additional catalyst such as acid for lignin removal, and therefore improves the quality of the final produced pulp without having any adverse effects on the quality of lignin. During the traditional organosolv process, in addition to applying heat for a certain time period, some type of catalyst, like acids, are added and used to break cellulose walls and help in the delignification process. However, in the absence of acid during a catalyst free organosolv process, depending on the type of biomass, extra time, extra energy, or both may be required to help the delignification process as disclosed herein. As a result of biomass fractionation, depending on process conditions, and the used biomass sources, some organic acids are being produced that may either react with other chemicals to form various types of esters, or stay in solution as acid that may facilitate and cause some degradation of fibers and deterioration of its quality. Depending on the final applications, there may be a requirement to neutralize the organic solvents by using some type of pH adjustment.

Generally, the catalyst free organosolv process according to the present invention is directed to the use of biomass materials in a reactor with an initial solvent that has two partially miscible liquids. One liquid being a fresh, spent or recycled lignin dissolving compound (herein referred to as the lignin dissolving chemical even though it may include or be formed from multiple chemicals), and the other being water, spent water or recycled water, together are called the initial solvent, and cooking them under autoclave conditions for a certain period of time. After the initial solvent including the initial lignin dissolving chemical, is placed in contact with the biomass by running it on, over, or through the biomass, the reaction with the biomass results in formation of a solid cellulose called pulp or fiber, and a new form of solvent called spent solvent. The spent solvent consists of spent water, water soluble solids dissolved in spent water, spent lignin dissolving chemicals, all soluble solids dissolved in spent lignin dissolving solvent, organic lignin dissolving chemical materials produced as a result of lignocellulosic biomass decomposition, and other chemicals produced as a results of other chemical interactions and fractionation process. With the use of self-sustaining chemicals such as esters, furans, and/or furfural forming at least a portion of the initial lignin dissolving chemical or the separated organic layer reused for a new biomass, the fractionation process becomes very efficient.

By one approach, after a period of time, part or all of the spent solvent from catalyst free organosolv process can be removed and either to be used for product recovery or for recycling back into more catalyst free organosolv processes. The spent solvent includes an aqueous and an organic part, along with all soluble solid in them, and when it is used for product recovery, the aqueous and organic parts may be settled or separated based on their density differences into used or spent organic layer, and used or spent aqueous layer that can be re-circulated, recycled or reused, with or without any pH adjustment, in all, or in part, as the next initial solvent for a new biomass processing.

By another approach, dissolved solids in the spent water from catalyst free organosolv process that includes water soluble minerals and compounds, various types of sugars, and other organic materials and compounds, is recovered from water by using some means of separation such as a membrane, chromatograph, evaporation etc. to form a recyclable water and water soluble solid products. Recyclable water in part or in all, with or without any pH adjustment, may be added to solvent that is in use, or to form a new initial solvent.

By yet another approach, dissolved solids in the spent organic layer from the catalyst free organosolv process includes pure lignin plus most of the other dissolved solids that can be separated from lignin dissolving solvent and all together are called poly lignin. Poly lignin is separated from lignin dissolving solvent by using some means such as distillation, to produce recyclable lignin dissolving solvent and poly lignin. Like other polymers, poly lignin is used as polymer or copolymer to produce polymeric parts, or broken down to its constituents such as phenols, etc. The recyclable lignin dissolving solvent in part or in whole, with or without any pH adjustment, may be added to a solvent that is in use, or it can be used to make initial solvent.

Specifically, by one approach, a catalyst free organosolv process for producing bio-products by decomposing lignocellulosic materials comprises of providing an initial lignin solvent comprising of water and a lignin dissolving chemical comprising of at least one of an organic ester like butyl acetate, an organic furan, and furfural. The lignin dissolving chemical for the initial solvent may include an alcohol like butanol, combined with an ester like butyl ester, an organic furan, or both. In this process, the initial solvent is then placed in contact with a biomass and cooked for a certain time at a certain temperature, with or without some type of agitation, or by solvent circulation that may be used to provide additional contact between biomass and solvent for the duration or part of the process time. After the period of time, the process includes separating the solid pulp from the spent solvent and it may include the separation of various products from the final spent solvent.

By one approach, a catalyst free organosolv process for producing bio-products by decomposing lignocellulosic materials, the biomass is placed first in contact with fresh or spent or recyclable lignin dissolving solvent, or fresh or spent or recyclable water, or both, or one after each other, for a period of time to impregnate and soften the biomass, followed by adding additional water and lignin dissolving solvent in the form of fresh or spent or recyclable liquids as necessary to make the desired amount of initial solvent mixture inside the reactor, and process the mixture for a period of time at a temperature above 150 C to delignify the biomass.

Alternatively by one approach, a catalyst free organosolv process includes premixing fresh or spent or recyclable water with fresh or spent or recyclable lignin dissolving chemicals in any combination to form the solvent first and then placing the solvent in contact with a biomass to form a mixture, and if required use some type of agitation such as forced or natural agitation or allow the solvent to permeate through the bed of biomass by circulation of the solvent to produce adequate contact between biomass and the recyclable solvent for a period of time. At any given time, all or part of the spent solvent can be extracted, settled and divided into an aqueous layer and an organic layer based on their specific densities by any means that can separate materials based on their densities such as leaving the solvent in a settling tank for a natural separation, or by passing it through a centrifuge, or other means. All or a portion of the aqueous and organic layers, separately, or both together can be reused with or without any pH adjustment as add on, or as an initial solvent to be placed in contact with a new biomass.

In another alternative approach, a catalyst free organosolv process includes mixing first a quantity of biomass with a quantity of fresh or spent or recyclable water in any combination, followed by adding a quantity of fresh or spent or recyclable lignin dissolving solvent in any combination to the mixture, or mixing first a quantity of biomass with a quantity of fresh or spent or recyclable lignin dissolving solvent in any combination, followed by adding a quantity of fresh or spent or recyclable water in any combinations to the mixture, or any other possible combinations, and continue the process for a period of time at a process temperature to advance the desired delignification process.

By another approach, for some special applications, a quantity of fresh or spent or recyclable solvent, or any combination of them is placed in contact with a quantity of biomass inside a reactor under an atmosphere that may include oxygen or an oxidizing gas or gases, hydrogen or a reducing agent or agents, or an inert gas, at a pressure above atmospheric pressure, with or without some type of agitation to provide additional contact between various parts of the mixture. The process then may involve recycling all or at least a portion of the spent or recyclable solvent with or without any fresh solvent by circulating it or recycling it back into contact with the biomass, or continually placing biomass in contact with the recyclable solvent for natural penetration of solvent into biomass, or use any type of agitation to continue mixing for a period of time. After the period of time, the process may include separating produced materials from the spent solvent.

By yet another approach, biomass with or without any portion of the fresh or spent or recyclable solvent is placed inside the reactor at a certain temperature and all of the remaining fresh or recyclable solvent with or without any pH adjustment is passed through a heat exchanger to elevate its temperature before it is injected into the reactor and placed in contact with biomass to form a mixture, and an external or an internal heater may be used to either increase the temperature of the mixture inside the reactor to a process temperature, or to maintain the required process temperature for the required process duration with or without any agitation, with or without any circulation of the recyclable solvent.

Among the various constituents of lignocellulosic biomass is lignin that is found in a wide variety of molecular weights and may be composed of various proportions of coniferyl, p-coumaryl and sinapyl alcohols. While articles and methods pertaining to lignin from biomass are known in the art, no process has been disclosed that has the separation of lignin from lignocellulosic biomass using catalyst free organosolv process whereby a composition comprising of lignin is prepared from lignocellulosic biomass that is suitable for use as a polymer that when it mixed with other materials can be used to make plastic articles Application of a catalyst free organosolv process causes change of the lignin characteristics such as changes of its melting point, which depending on the extent of this change, the resultant lignin may become suitable for use as an adhesive, or as a dye or colorant to provide colors from a light brown to a dark brown to black when it is mixed with other polymers, or as an additive compatible with most of various polymers used to make plastic articles.

In accordance with another aspect of the present invention is provided a catalyst free organosolv process for producing bio-products by fractionating and decomposing lignocellulosic materials comprising: A) providing an initial solvent comprising of a quantity of water and a quantity of one or many lignin dissolving chemicals such as alcohol like butanol, esters like butyl acetate, furans like furfural, etc.; B) placing the initial solvent in contact with a quantity of biomass in an autoclave-type environment and keeping the mixture at a process temperature during a process time; and C) effecting some or all of the available lignin and some or all of the available hemicellulose to be removed from biomass and dissolved into the solvent to form a solvent soluble phase or spent or used solvent, and a solvent insoluble phase or pulp.

In accordance with another aspect of the present invention is provided a process as set forth above wherein the spent solvent comprises an organic materials portion that also includes water insoluble lignin, and an aqueous material portion that can be separated from each other.

In accordance with another aspect of the present invention is provided a process as set forth above comprising reusing at least a part of the spent solvent as an initial solvent and place it in contact with more biomass.

In accordance with another aspect of the present invention is provided a process as set forth above comprising reusing at least a part of the separated organic portion of the spent solvent as part of an initial solvent and place it in contact with more biomass.

In accordance with another aspect of the present invention is provided a process as set forth above comprising reusing at least a part of the separated aqueous portion of the spent solvent as part of an initial solvent and place it in contact with more biomass.

In accordance with another aspect of the present invention is provided a process as set forth above wherein the solvent insoluble phase can be removed and used as pulp.

In accordance with another aspect of the present invention is provided a process as set forth above further comprising separation of dissolved solid from the organic portion of the spent solvent by some means such as evaporation and condensation of the liquid part, to recycled lignin dissolving solvent for future use.

In accordance with another aspect of the present invention is provided a process as set forth above further comprising using part or all of the recycled lignin dissolving solvent with or without pH adjustment as initial lignin dissolving solvent for more fractionation of biomass.

In accordance with another aspect of the present invention is provided a process as set forth above further comprising separation of dissolved solid from the aqueous portion of spent solvent by some means such as evaporation and condensation of the liquid to form recycled water.

In accordance with another aspect of the present invention is provided a process as set forth above further comprising using part or all of the recycled water with or without pH adjustment as initial lignin dissolving solvent for more fractionation of biomass.

In accordance with another aspect of the present invention is provided a process as set forth above wherein the biomass impregnated with fresh, spent, or recyclable lignin dissolving solvent with or without pH adjustment prior to catalyst free organosolv processes.

In accordance with another aspect of the present invention is provided a process as set forth above wherein the biomass impregnated with extra fresh, used, or recyclable water with or without pH adjustment prior to catalyst free organosolv process.

In accordance with another aspect of the present invention is provided a process as set forth above wherein the biomass impregnated with fresh, used, or recyclable solvent comprising both water and lignin dissolving solvent prior to catalyst free organosolv processes.

In accordance with another aspect of the present invention is provided a process as set forth above wherein the initial solvent is comprised of A) A quantity of water comprising a mixture of any percentage of fresh water, used aqueous layer, recyclable water, or any combination of them, with or without pH adjustment; and B) A quantity of lignin dissolving chemicals comprising of a mixture of any percentage of fresh, used, recyclable organic layer, or any combination of them, with or without pH adjustment.

In accordance with another aspect of the present invention is provided a process as set forth above further comprising contacting the solvent with the biomass in an inert atmosphere or in an oxidizing atmosphere, or in a reducing atmosphere depending on expected results.

In accordance with another aspect of the present invention is provided a process as set forth above wherein the biomass comprises of dry lignocellulosic material provided at a 1 to 5 ratio, or higher with the solvent.

In accordance with another aspect of the present invention is provided a process as set forth above further comprising increasing production of at least butyl acetate by increasing the process temperature.

In accordance with another aspect of the present invention is provided a process as set forth above further comprising the application of some type of agitation or mixing that can increase potential contact between solid particles and liquid solvent during part, or all of the fractionation process.

In accordance with another aspect of the present invention is provided a process as set forth above further comprising increasing production of at least butyl acetate by keep recycling the solvent without any pH adjustment.

In accordance with another aspect of the present invention is provided a process as set forth above further comprising increasing production of acetic acid by increasing process temperature and reducing process time.

In accordance with another aspect of the present invention is provided a process for isolating poly lignin from spent lignin dissolving solvent, wherein the separation process comprises of; solvent extraction, chromatography, distillation, filtration, pressing, recrystallization, and/or solvent-solvent partitioning using the separated liquor with or without pH adjustment as recyclable lignin dissolving solvent.

In accordance with another aspect of the present invention is provided a process as set forth above further comprising compounding or co-extruding a quantity of poly lignin with a quantity of one or more polymers to produce a polymeric object.

In accordance with another aspect of the present invention is provided a process as set forth above further comprising compounding or co-extruding a quantity of poly lignin with a quantity of one or more polymers as a colorant for a polymeric object.

In accordance with another aspect of the present invention is provided a process as set forth above further comprising leaving a percentage of lignin dissolving solvent in poly lignin to make a formable solid at room temperature that can maintain its form at lower temperatures.

In accordance with another aspect of the present invention is provided a process as set forth above further comprising removing most of lignin dissolving solvent from the used lignin dissolving solvent to make a sustainable solid form of poly lignin at room temperature.

In accordance with another aspect of the present invention is provided a process as set forth above further comprising using extra water or recyclable aqueous layer during a distillation process to further drive lignin dissolving solvent out of poly lignin.

In accordance with another aspect of the present invention is provided a process as set forth above comprising all combinations and sub combinations of all aspects and objects above.

These and other objects and aspects will become readily apparent upon further review of the following specification and drawings. Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 6 is a typical gas chromatography (GC) graph showing some of the main organic chemicals and a typical picture of the fibers produced after fractionation of southern yellow pine using catalyst free organosolv process.

FIG. 7 is a typical gas chromatography (GC) graph showing some of the main organic chemicals and a typical picture of the fibers produced after fractionation of southern yellow pine using traditional organosolv process with catalyst.

DETAILED DESCRIPTION OF THE INVENTION

Figure 1:
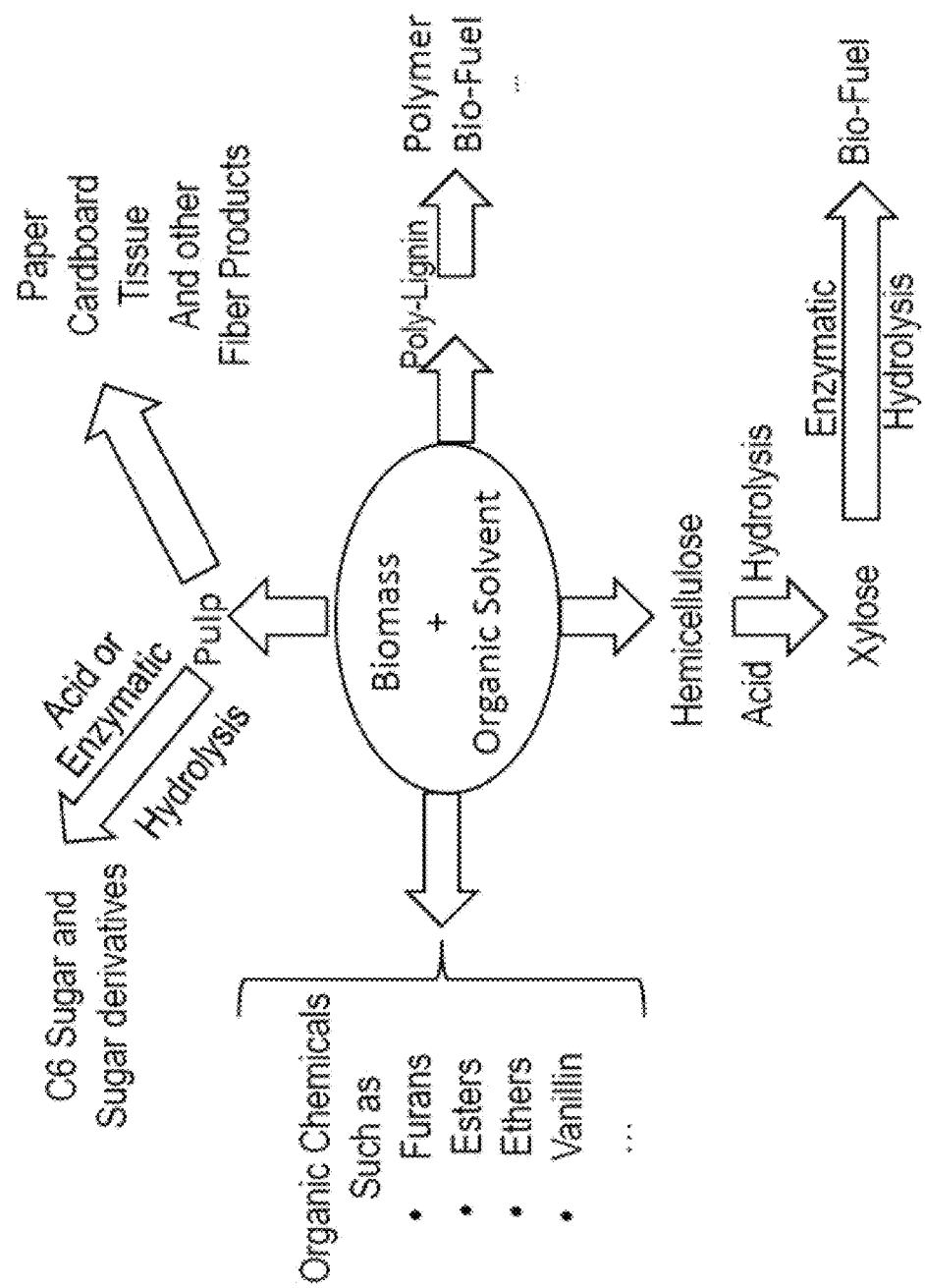
FIG. 1 is a diagram of a catalyst free organosolv biomass fractionation process and the products produced therefrom.

Disclosed herein is a temperature, atmosphere, and time controlled catalyst free organosolv fractionation process that uses a solvent, consisting of water and a mixture of lignin dissolving solvents, together called initial solvent, to interact with any lignocellulosic biomass material to separate the lignin from cellulose, free up the hemicellulose or partially convert it to organic chemicals, change the composition of the initial solvent into a new solvent that includes some or all materials in the initial solvent plus all the chemicals resulting from decomposition of lignocellulosic biomass, and the end result is a solid phase that includes most of the remaining cellulose, and a liquid phase that includes all or part of the initial solvent, all or part of the chemicals produced as a result of biomass decomposition, and other chemicals or biochemicals produced as a result of chemical actions of available materials in the initial solvent and biomass, that together is called spent solvent. Depending on the type of biomass and applied process parameters, the spent solvent may include some organic acid such as acetic acid, formic acid, etc. Although most of the produced organic acids are going to be used to produce various esters such as acetic acid, butyl esters, formic acid butyl ester, etc., some may remain in the spent solvent which may cause the reduction in pH of the spent solvent. If the spent solvent with a reduced pH is used for further delignification of more lignocellulosic biomass, it may reduce fiber quality. As a result, depending on the fiber applications, a minor adjustment of pH by using organic or inorganic bases may become necessary before reusing the spent solvent or any of its components.

After separation of the spent solvent or liquid phase from the remaining cellulose or solid phase, part, or all of the spent solvent with or without any pH adjustment may be used to place in contact with more lignocellulosic biomass for more delignification, or may be sent to further separation processes to separate spent aqueous and spent organic layers from each other based on their density differences by using any kind of separation method such as natural gravity separation in a settling tank for a few minutes or many hours, using centrifuges, membranes, chromatography, etc. Part or all of the spent aqueous and spent organic layers can be recycled or recirculated to a new or an ongoing fractionation process for further delignification of more lignocellulosic materials.

The spent organic layer that includes all or most of the lignin dissolving solvent plus all or most of dissolved solids may be reused as is, with or without any pH adjustment, or it can be processed to separate some or all of its lignin dissolving solvents from its dissolved solids. After the separation of its dissolved solids, the remaining lignin dissolving solvent is collected in a form of liquid or vapor and can be used with or without any pH adjustment as recyclable lignin dissolving solvent for further delignification of more biomass, or it can be separated into its constituents such as alcohol, esters, furans, etc. by any means such as fractional distillation, chromatograph, etc., recycled back as a solvent, used for other internal applications, or sold as products. When most or all of the lignin dissolving solvent is removed, the remaining dissolved solids are collected in any form from a thick liquid to a complete solid, depending on how much of the remaining lignin dissolving solvent remains in it, and it is called poly lignin.

Comparing catalyst free and the traditional organosolv process with catalyst, it was discovered that the catalyst free process requires more H-Factor energy in the form of combined process temperature and process time. The catalyst free process has been shown to produce less furfural, collect less lignin in the organic layer, and collect less water soluble materials in aqueous layer. It will however, produce a higher pulp yield, and provide a much better quality of pulp with a longer fiber length as presented in FIGS. 6 and 7.

It was discovered that catalyst free organosolv prevents further destruction of cellulose and a reduced decomposition of cellulose and hemicellulose into organic chemicals such as formic acid and formic acid butyl ester or other materials that are typically produced as a result of traditional organosolv processes. So, while the catalyst free organosolv process is still capable of producing a high quality poly lignin, it also provides more pulp, preserving the fiber qualities, and provides much better fiber length and strength, but it produces slightly less new organic solvents.

It was also discovered that as a result of catalyst free organosolv process, yield of fiber increases while the yield of other cellulose derivatives such as glucose, esters, furans, etc. are decreased. In comparison, the catalyst free organosolv process produces pulp that may have slightly a higher KAPPA number than traditional organosolv processes.

Moreover, depending on the biomass source, process time, process temperature, and process atmosphere, the catalyst free organosolv process may produce some organic acids such as acetic acid, formic acid, etc. that are being released to the spent solvent. However, in the presence of some organic chemicals such as butanol, part or all of these acids are being consumed to produce esters such as acetic acid butyl ester, formic acid butyl ester, etc. which in turn are also used as organic solvents. As a result of these reactions, some organic solvents such as butanol may be consumed to produce esters, and therefore, if production of these esters are desirable, fresh butanol may be added to the mixture to assure the required balance in the mixture and to minimize the availability of the produced acid that can assist in deterioration of the fiber quality. However, the net results would be a production of more lignin dissolving chemicals that are produced from the resulting fractionation process as a new lignin dissolving solvent, that with or without pH adjustments, may be reused to place in contact with more biomass for delignification of more biomass.

The catalyst free organosolv process releases more hemicellulose into aqueous part of the solvent that can be hydrolyzed to produce xylose, and separated for other applications such as production of xylitol, biofuels, etc. The spent aqueous layer contains some water soluble minerals and salts in the form of dissolved solids, that when they are partially or completely removed by any means such as distillation, membrane, etc. the remaining water can be used with or without any pH adjustment as recyclable water for further use in more delignification processes, and the remaining solids may be used as a soil amendments.

For instance, once the process is completed for a biomass currently in the reactor, the spent solvent with or without pH adjustment may be separated into two parts including an organic material portion that also includes the poly lignin, and an aqueous solution portion. The organic material portion and aqueous solution portion may then be reused with or without pH adjustment like the initial lignin solvent to further delignify the biomass that is being processed or to delignify the next new biomass. The organic material portion and aqueous solution portion with or without pH adjustments may be placed in the new initial lignin solvent without further solids separation processing. Alternatively, for example, the organic material portion may be further distilled to obtain certain chemicals such as the produced butyl esters, organic furans, or both. When desired, these certain chemicals, with some or no additional fresh organic solvent may be used as the lignin dissolving chemicals in a new initial lignin solvent for the next new biomass. The recycled or the spent chemicals may form the entire next initial lignin solvent, or may reduce the amount of fresh solvent chemicals, such as butanol, necessary for continuing the process over multiple or many subsequent new biomass fractionations.

Prior to the fractionation process, biomass can be physically processed, subdivided into parts or pieces (e.g., biomass can be chopped, milled or ground into pieces or parts that can be characterized as granules, particulates or fine powders). Biomass can also be subjected to external forces or pressure (e.g., by being pressed). When carrying out such processing conditions, biomass can have a moisture content that approximates its natural moisture content (e.g., its moisture content immediately upon harvest), a moisture content achieved by adding moisture to the biomass or a moisture content that results from the drying of the biomass.

In one form, by varying the conditions or parameters of the process, the process may become more efficient in production of certain products. For example, when processing southern pine, if the process temperature increases from 190° C. to 210° C., the organic layer of the solvent collects more lignin, the aqueous layer of the solvent collects more water soluble materials, the pulp yields drops, more esters are produced, and the pulp's KAPPA number decreases.

In one form, when the H-Factor (related to time and temperature variation) is kept relatively constant, changing other parameters such as process time and temperature may affect the outcome. For example, processing hardwood without bark, in comparing a process performed at 199° C. for 90 minutes with a process performed at 190° C. for 180 minutes, the process with higher process temperature produced less pulp, less furfural, less butyl acetate, but more acetic acid. When time and temperature variations were used to keep the H-Factor relatively constant in processing hardwood with bark, in comparing a process performed at 199° C. for 90 minutes with a process performed at 190° C. for 180 minutes, the process with higher process temperature produced more pulp, less acetic, and almost the same amount of furfural and butyl acetate.

In another form, when solvent, as it is, without any pH adjustment was reused several times, after each process, the percentage of butyl acetate in the organic solution part of recyclable solvent kept increasing, but the percentage of furfural stayed relatively constant.

In a further form, the process uses about five to fifteen grams of solvent per every one gram of lignocellulosic material. In another form, the process uses a ratio of about five to one grams solvent to biomass.

It was discovered that depending on the lignin dissolving solvent's ingredients, it can dissolve 5 to 25% lignin before saturation. The dissolved lignin can be precipitated in form of lignin salt by introducing some minerals like calcium, or it can be separated in form of poly lignin by some means of separation process such as distillation, membrane, ion exchange resins, increase or decreasing the solutions temperature, washing with water, etc.

In an embodiment, the separating of poly lignin from lignin dissolving solvent process comprises of freezing the solution, which results in partial precipitation of lignin.

In another embodiment, the separating of poly lignin from lignin dissolving solvent process comprises of heating up the solution which results in vaporization of lignin dissolving solvent and separation of poly lignin. The vapor results from this process can be used as is, or can be condensed to reclaim the lignin dissolving solvent in the form of liquid recyclable lignin dissolving solvent and in either vapor or liquid form can be placed with more lignocellulosic biomass for more delignification.

In another embodiment, the separating of poly lignin from lignin dissolving solvent process comprises application of a membrane that can only allow lignin dissolving solvent to pass through and keep the poly lignin for collection.

In yet another embodiment, the separating of lignin from lignin dissolving solvent process comprises of an application of one or several ion exchange resins that can separate esters, ethers, furans, organic acids, etc. from poly lignin.

In another embodiment, the separating of poly lignin from lignin dissolving solvent process comprises of adding extra water to the solution and evaporating the mixture of water, and lignin dissolving solvent together. This process results in production of poly lignin with less remaining lignin dissolving solvent in it. When mixing extra water, some of the lignin dissolving solvents are dissolved in water, and the rest, due to differences between densities of water and the lignin dissolving solvent, stays on top of the water. During evaporation, the top layer is evaporated faster, and since the poly lignin is not dissolved in water, at the end when water is all evaporated, the remaining poly lignin will have a limited to zero remaining lignin dissolving solvent in it.

In still another embodiment, the separating of poly lignin from the lignin dissolving solvent process comprises of chromatography, distillation, filtration, pressing, recrystallization, and/or solvent-solvent partitioning.

It has been known in the prior art that by the application of traditional pulp manufacturing process such as soda based processes, recovered lignin is rarely isolated in its pure form. It is generally not free from other contaminating materials including minerals, and any further purification requires extra works. The poly lignin obtained from organosolv processes includes mostly pure lignin and small amount of other bio driven materials that generally are able to dissolve in organic solvents, and therefore it is mostly insoluble in water.

Depending on the biomass resources, with more than about 2% and less than about 10% lignin dissolving solvent in it, the poly-lignin may be in a hand formable solid at room temperature, and as the temperature drops, it becomes more brittle and less formable. At less than 2% remaining lignin dissolving solvent in it, at room temperature, poly-lignin is completely solid and brittle like glass and any additional forming process may require additional thermal energy.

It has been discovered that the availability of some lignin dissolving solvent in poly lignin helps to reduce its melting point, and facilitates poly lignin to blend much better and easier with other polymers to form bonds between poly lignin and other polymers during compounding, co-injection or co-extrusion processes. Depending on the source of the biomass and the availability of the remaining lignin dissolving solvent in poly lignin, its melting point can change from room temperature to about 250° C.

Catalyst Free Biomass Fractionation Process

Now in more detail, lignocellulosic feedstock that forms the biomass used by the process may include a wide variety of material such as agricultural wastes, forestry products, forestry wastes, cellulosic rich municipal wastes, or other cellulose rich industrial wastes, and more specifically, materials ranging from wood, wood chips, bagasse, grass, corn stover, corn stalks, bark, straw, energy crops, husks, left overs of industrial hemp, and any leftover wastes from any agricultural crops to name a few examples. The main problem with lignocellulosic materials as a feedstock is releasing the cellulose itself. In a plant, fibers are glued together by lignin, and to release the cellulose from the lignin, by one approach, the lignin may be dissolved in a lignin dissolving chemical. While a solvent including the lignin dissolving chemical dissolves lignin and causes delignification of biomass, it also produces and releases some acids such as acetic acid, formic acid, etc. that in turn will be consumed to make esters which are lignin dissolving solvents too and therefore, the process generate more lignin dissolving solvent as the process progresses.

In one form, the catalyst free organosolv based fractionation process used to dissolve the lignin, includes mixing the biomass and solvent in a pressurized reactor at a certain temperature, for a certain time, under a certain atmosphere that may include oxygen to make more organic solvent, inert gas to avoid the oxidation of certain materials, hydrogen to produce other classes of organic chemicals, etc.

Referring to FIG. 1, one advantage of this catalyst free organosolv process is that all the fractions products may be collected separately and utilized separately to make this process more selective and profitable. In other words, when lignin dissolving chemicals are being used with water as the solvent, and are placed in contact with a given lignocellulosic biomass, the process ultimately produces high quality fibers in the form of a solid that are not soluble in the solvent, and all other materials that are soluble in the solvent in a form of liquid. If the used or spent solvent liquid is placed in a settling or separating tank, the solvent separates into two layers including an upper organic layer (the liquor) that includes all materials that are soluble in lignin dissolving solvent (organic solvent), and a lower aqueous layer that includes water and all water soluble materials coming from the fractionation of lignocellulosic biomass. Alternatively, other processes such as a centrifuge can be used to separate the aqueous layer from the organic layer.

The organic layer substantially includes all materials left over from the original or initial input lignin dissolving solvent, or all materials carried over by using the spent lignin dissolving solvent, plus lignin and all other solids that can be produced and dissolved in lignin dissolving solvent during the process, and most of the organic materials made as a result of the fractionation process. The aqueous layer includes water and all water soluble materials such as sugars, some minerals, acids, and organic materials based on their solubility in water. Thus, the process is adaptable because the materials produced from the fractionation can be separated and removed easily to produce a desired resulting chemical or product.

The catalyst free fractionation process here can be controlled by its process parameters to produce combinations of products. For example, the biomass and lignin dissolving chemical in the solvent, when heated under pressure, may separate poly lignin from lignocellulosic materials and dissolve it within the recyclable solvent. When the poly lignin is separated from the solvent, it can be used as the main source of renewable aromatic materials for production of bio-fuels, and other products, or it can be used as a natural polymer in the form of additives to be co-injected into molds to make consumable polymeric products in plastic industries, or co-extruded into plastic sheets for other applications. When the hemicellulose, hydrolyzed or not, is produced and dissolved in the aqueous layer, it may also be obtained as a separate stream for use in biofuels or other chemicals manufacturing. In addition, the resulting pulp may be used for pulp derivative products such as paper, linerboard, etc., or it may be hydrolyzed by either enzymes into C6 sugars which can be fermented into any sugar derivatives such as biofuels, or submitted to acid hydrolysis to form sugar or high value organic chemicals such as Levulinic acid, butyl ester, for example.

Other organic materials that may be produced from the separated organic layer include Furans, Esters, and Ethers, which may be used as a solvent (the lignin dissolving chemical) to continue the fractionation process, or they can be separated and sold as chemicals.

Figure 2:
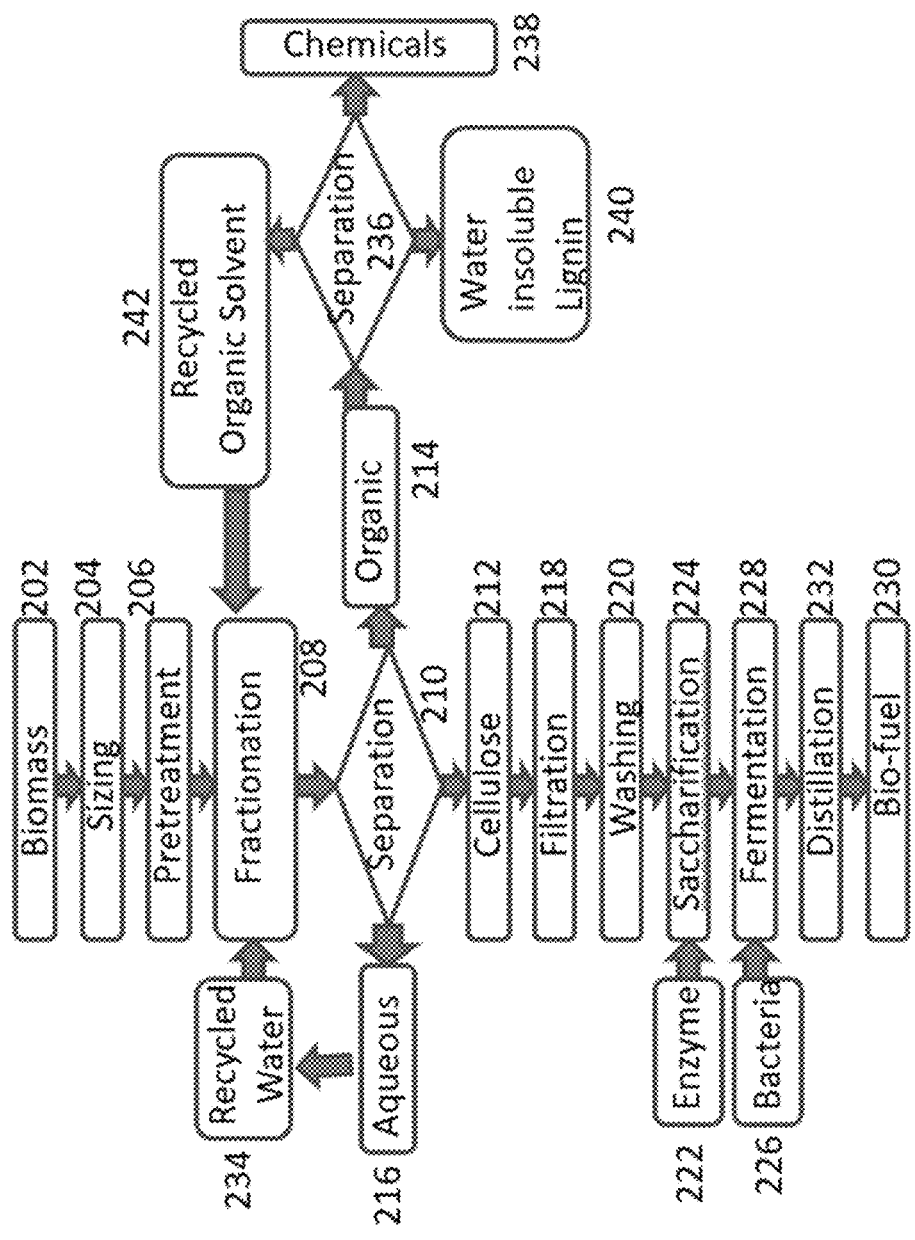
FIG. 2 is a process flow diagram of a typical catalyst free organosolv-based, biorefinery to convert lignocellulosic biomass into value added products and biofuel.

Referring to FIG. 2, a catalyst free organosolv process includes obtaining the biomass 202, and sizing 204 the biomass by chopping, cutting, milling, and so forth, and using screens or sieves to separate and produce the desire size or until, by one example, biomass pieces of approximately 0.5 inch by 0.25 inch by 1.0 inch are obtained. Other alternatives include about 0.4-0.6 inches by about 0.2-0.3 inches by about 0.9-1.1 inches. Yet another alternative includes all sizes of wood chips and fine particles like saw dust that can be loaded into any typical fractionation reactor by some means. Next, the pieces can be pre-treated 206 by soaking them for a given time, ranging from a few minutes to several hours or overnight, in water, or in lignin dissolving solvent or both, to obtain uniform moisture content, soften the materials, or impregnate the biomass with organic solvent by one approach. Thereafter, the biomass pieces are placed in the reactor 1 of FIG. 4 or container 1 of FIG. 3.

Figure 3:
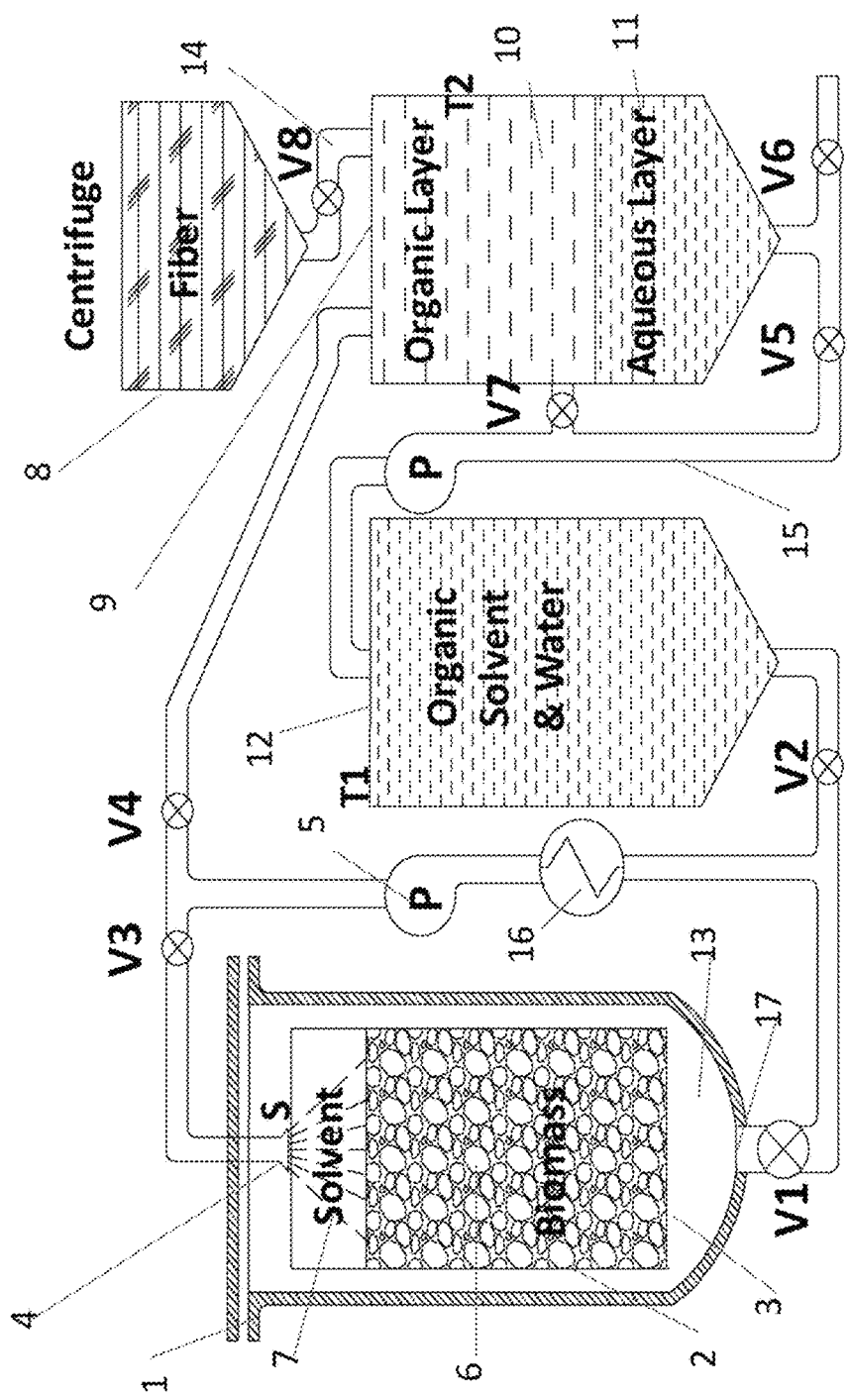
FIG. 3 is a diagram of a recirculating solvent based bio-refinery fractionation reactor system that can be used to perform the process of FIG. 2.

Referring to FIGS. 2 and 3, the catalyst free organosolv processes herein may use continuous or batch processes in an autoclave-type environment. An example of a batch reactor in FIG. 3 is the reactor 1 that is fluidly connected by valves V3 and V4 to a separation or settling tank 9 (T2), and by valves V1 and V2 to an initial solvent tank 12 (T1). Specifically, for the start of each new batch, biomass pieces are placed in the reactor 1. Then, initial lignin solvent is provided from the solvent tank 12 via pump 5, and by opening valves V2 and V3 and closing valves V1 and V4. This delivers the initial solvent to an inlet, or in this case to the top, of the reactor 1. The initial solvent is placed in contact with the biomass in the reactor 1 and flows on, or over the biomass until it reaches an outlet of the reactor. Valve V1 opens and valve V2 closes to allow circulation of the initial solvent to flow from the outlet or bottom of reactor 1 back to the inlet or the top of reactor 1 as described below. At the end of the process, valve V3 closes, and valve V4 opens (and valve V1 is already opened) to transfer the final or resulting liquid that is now the recyclable solvent 13 to the separation tank 9. Valve V5 may be provided as an outlet to collect aqueous layer material from the separation tank 9 which may then be poured back into the initial solvent tank 12 (T1) for reuse in the initial lignin solvent for a new batch of biomass in the reactor 1. Valve V7 may be provided as an outlet to collect organic layer material from the separation tank 9 which may then be poured back into the initial solvent tank 12 (T1) for reuse in the initial lignin solvent for a new batch of biomass in the reactor 1. Otherwise, the collected material from the separation tank 9 (T2) may be taken away in all, or in part, by using valve V6 for further processing including separation toward end products. In one form, however, the organic material, or the liquor, may be distilled to remove various organic esters and furans, for example, so that just the lignin dissolving chemicals, or specified amounts of the lignin dissolving chemicals, are reused and placed into the initial solvent tank 12 for use with a subsequent or next new biomass in the reactor 1.

In more detail, the reactor 1 in FIG. 3 may include atmosphere with some oxygen, hydrogen, inert gas, or any other special gases at least one basket 2 with a solid cylinder and a perforated bottom 3 or perforated bottom and sides, for holding a biomass 6. A shower head 4 sprays solvent 7 that includes water and initial lignin dissolving chemical(s), into and inside the basket 2 and onto biomass 6. The solvent 7 flows on, over or through the biomass until it exits through an outlet 17 at the bottom 3 of the reactor as the recyclable solvent 13. In one form, the solvent may not collect within the reactor 1, and may flow continuously through the reactor 1 unless the valve V1 is closed. It will be understood that the reactor may alternatively have other configurations to deliver the solvent to the biomass and through the reactor. Thus, the reactor may also have some type of mixing system such as ultrasound mixer instead or in addition to the shower head so that the solvent is collected in the reactor and then mixed to facilitate chemical reaction between the solvent and biomass.

Figure 4:
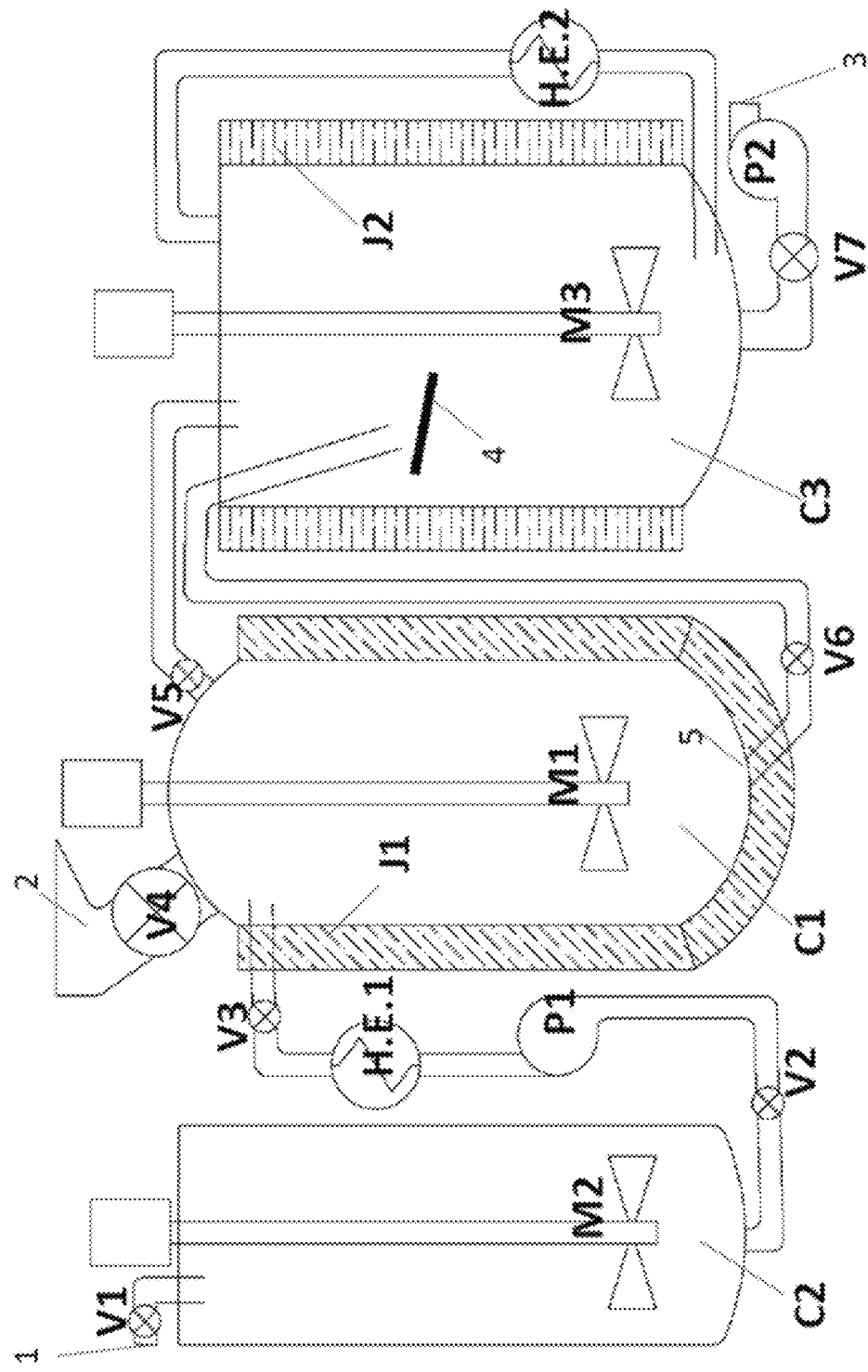
FIG. 4 is another diagram of a mixer based fractionation reactor system that can also be used to perform the process of FIG. 2.

Referring to FIG. 4, another example of a reactor for the catalyst free Organosolv processes herein that may be used in continuous or batch processes in an autoclave type environment. The reactor 1 in FIG. 4 is connected to hopper 2 by valve V4 that allows lignocellulosic biomass to flow into cavity C1. Outlet 5 is a simple pipe that connects cavities C1 and C3 via valve V6 where separation 210 of FIG. 2 takes place. Cavity C1 is used to either premix the organic solvent and water, or stage each component of the solvent individually and direct them toward reactor 1 through valve V2 by using pump P1. The solvent materials can individually or collectively be pumped through pump P1 and pass through an optional heat exchanger HE1 to increase their temperature to a desired level and valve V3 into reactor 1. Reactor 1 can also be equipped with some type of external heater such as an oil or steam jacket J1 to increase or maintain the process temperature inside the reactor 1. Likewise, cavity C3 can have a jacket J2 to control the temperature of the materials inside cavity C3. Throughout the catalyst free organosolv process, the biomass and solvent may be mixed together by agitator M1. On a batch process, at the end of fractionation, the cavity C2 is depressurized by opening the valve V5 to a desirable internal pressure for C1. After depressurization, by opening valve V6, the mixture inside the cavity C1 is directed toward cavity C3. If desirable, the content of cavity C1 will hit a hard surface 4 to further break down the pulp by a mechanical impact action before settling inside cavity C3.

The initial solvent can be formed by using 10% to 90% lignin dissolving solvent and 90% to 10% water or any combination of percentage in between. By one example, the initial solvent may include about a 50-50 (weight %) of an organic based lignin dissolving chemical and water. As described herein, the lignin dissolving chemical for the first initial lignin solvent may be any fresh lignin dissolving chemical or chemicals, any spent lignin dissolving chemical or chemicals, or any recycled lignin dissolving chemical or chemicals, or any combination of them. Alternatively, the initial lignin solvent can be all, or in part, the spent solvent as it is, with or without any pH adjustment, or after passing it in part, or all through some type of separation process.

The circulation of the spent solvent, in one form, occurs without separating any of the material from the spent solvent. Thus, the circulation of solvent may contain organic materials or liquor, poly lignin, other biomass derivative compounds, and water, which are all placed back into contact with the biomass at least once, and in one form, many times.

Alternatively, a portion of the spent solvent may be redirected away from reactor 1 or the circulation loop for more immediate separation and processing while the remainder of the recyclable solvent is being circulated over, or through the biomass. In this case, as another option, a fresh or recycled initial lignin dissolving solvent may be supplied to the reactor to replace the removed spent solvent while the circulation or cooking period is continued.

After the process time period is completed, the initial solvent 7 of FIG. 3 is fully transformed into the spent solvent that includes liquor that is enriched with the dissolved lignin, other materials that are soluble in lignin dissolving solvent, generated chemicals, water, and other materials that are soluble in water. This solution is collected in cavity 13 of FIG. 3 and removed through opening 17 of FIG. 3. This final or resulting spent solvent is then extracted into the settling or separation tank 9 of FIG. 3 for separation 210 of FIG. 2.

At the end of processing time, the initial biomass 202 converts to pulp 212 that is mostly cellulose with some left over hemicellulose, lignin, and spent solvent is directed to a separation process such as a centrifuge or screw press to extract more solvent from it. The separated liquid from centrifuge 8 of FIG. 3 may be directed to the settling tank 9 through a flow path 14 for one example, or otherwise may be removed from the centrifuge and directed into the staging tank 12. Inside the settling tank 9, the spent solvent 13, in one example, is mainly in a liquid phase, separated into an organic layer 10 (214 of FIG. 2) that floats on top due to its density, and an aqueous layer 11 (216 of FIG. 2) that moves to the bottom of the separation tank 9. The remaining solid 6, (212 of FIG. 2) from the centrifuge 8 is washed (220 of FIG. 2) to obtain clean solvent free fibers. The clean fibers can either be used as an input to a paper mill for making high quality paper from it, or will go through some type of enzymatic or acid hydrolysis for saccharification (224 of FIG. 2).

Referring again to FIG. 2, all or part of the aqueous layer 216 with or without pH adjustment is recycled 234 back into the system, in one form, into the initial solvent tank 12 of FIG. 3 to be used as part of the initial lignin solvent 7 of FIG. 3 for the next new biomass. In another form, all or part of aqueous layer 216 may go through some type of separation process such as distillation, membrane separation, reverse osmoses, etc. to remove part, or all water soluble minerals or valuable chemicals from it before recycling it back to the process. All or part of the organic layer 214 also may be sent to a distillation system for separation 236 to separate desirable chemicals 238 such as furans (including furfural), esters (including formic acid butyl ester, or butyl acetate), ethers, vanillin, and the poly lignin 240 from the remaining organic solvent 242 (also referred to as the solvent for recycle or simply solvent recycle).

Figure 8:
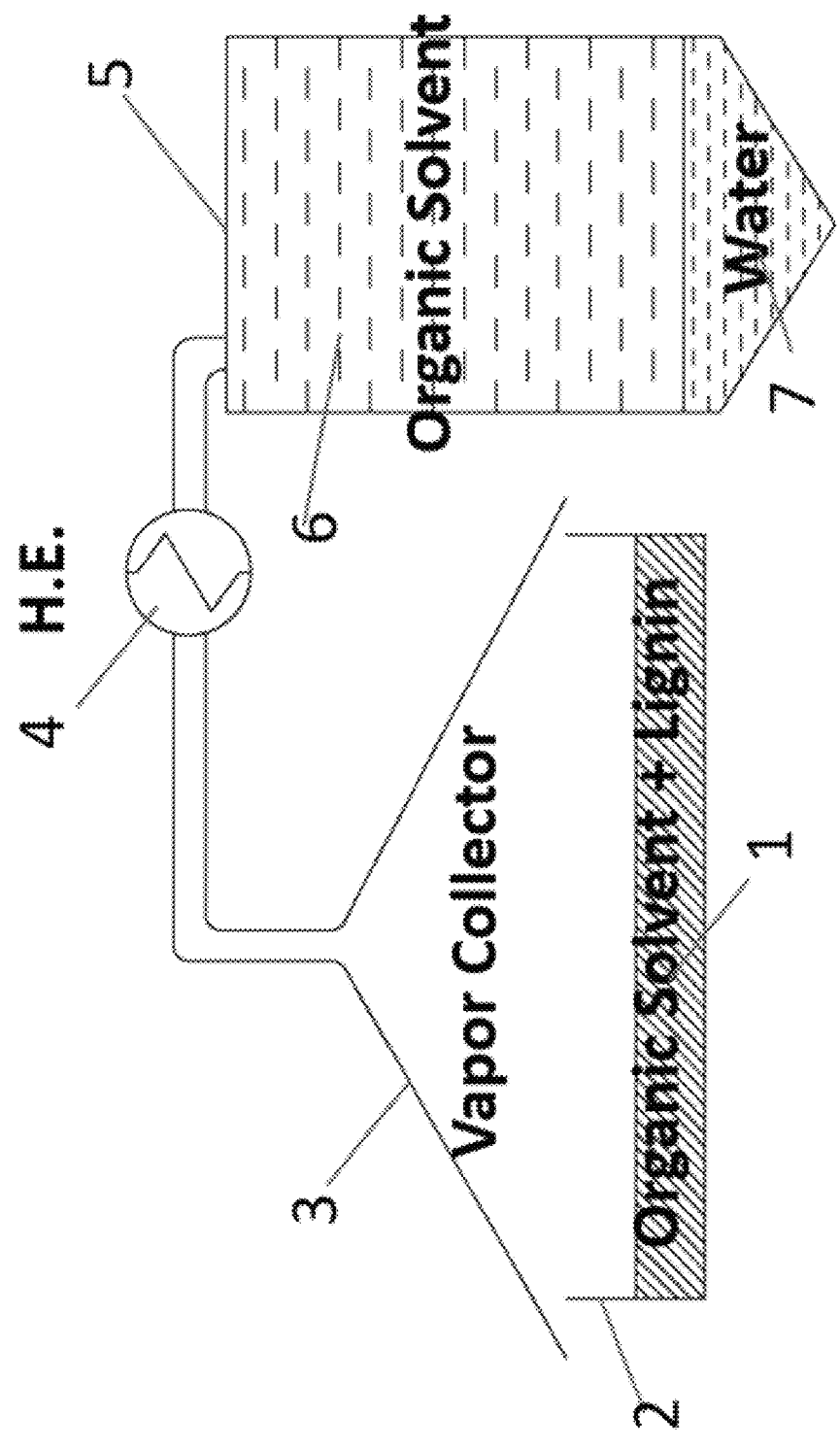
FIG. 8 is a schematic of separation of the lignin dissolving solvent from poly-lignin and recovery of the products.

Referring to FIG. 8, the process of separating lignin from lignin dissolving solvent comprises of placing the mixture of lignin and the lignin dissolving solvent 1 in an evaporation tray 2, applying heat to evaporate the lignin dissolving solvent, using the vapor collector 3, passing the vapor through the heat exchanger 4 to condense the vapor to liquid, and directing the liquid into tank 5 that includes mostly lignin dissolving solvent. However, since water to some extent is also soluble in most of the lignin dissolving solvents, tank 5 may also include the water 7, and due to its density, it will stay below the lignin dissolving solvent 6.

Figure 9:
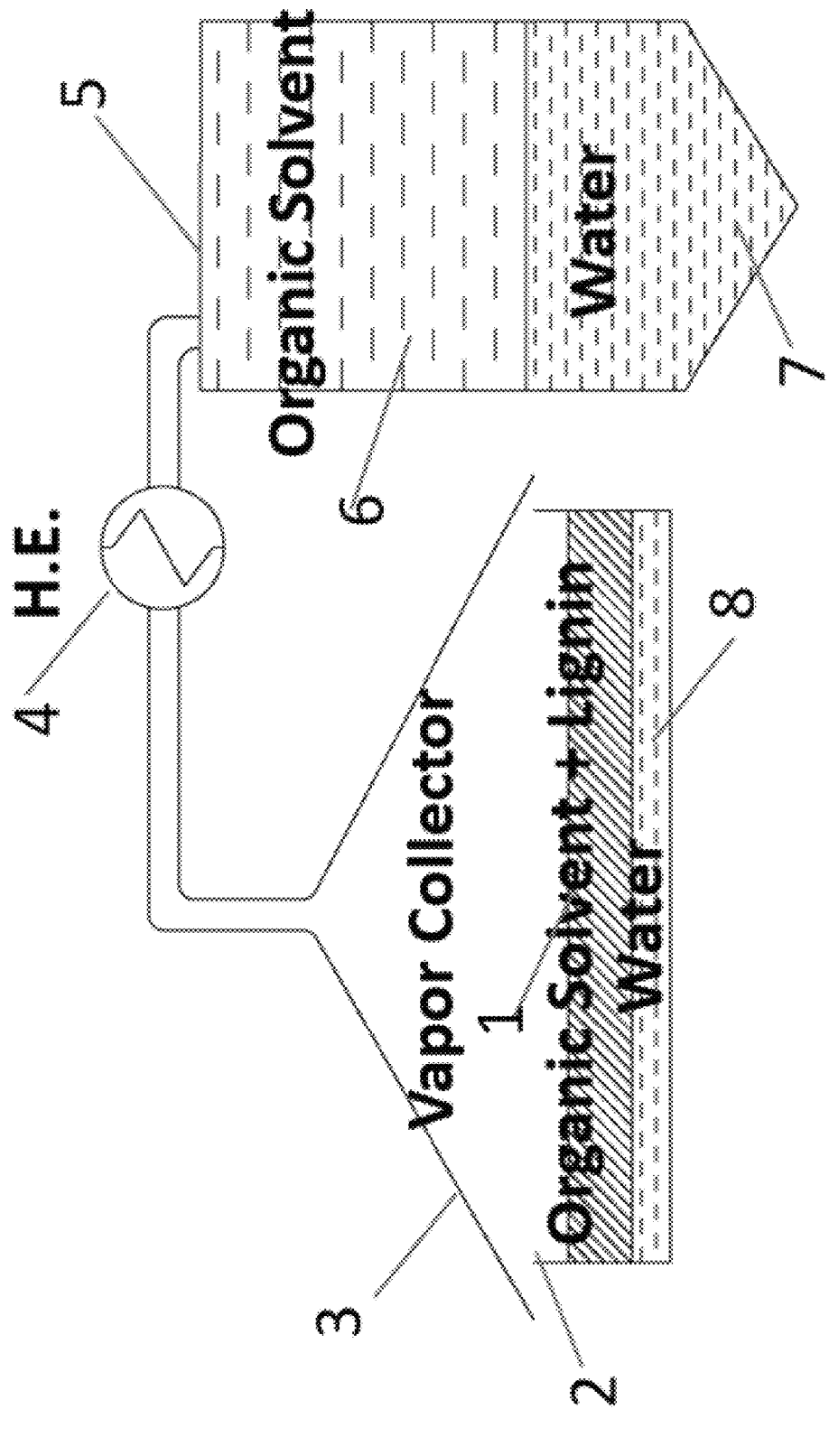
FIG. 9 is another schematic of separation of most of the lignin dissolving solvent from poly-lignin and recovery of the products by using additional water or recycled water.

Referring to FIG. 9, the process of separating lignin from lignin dissolving solvent comprises of placing the mixture of lignin and the lignin dissolving solvent 1 in an evaporation tray 2, adding extra water 8 before, during, or after evaporation of the organic solvent to force additional organic solvent out of the poly lignin. Applying heat will send water 8 which is usually below the lignin dissolving solvent, in the form of steam through the lignin dissolving solvent layer 1 and poly lignin, therefore removing more solvent out of the poly lignin. The vapor collector 3 collects vapor and passes it through the heat exchanger 4 to condense it back to a liquid form, and directs the liquid into tank 5. As a result, inside the tank 5, in addition to the lignin dissolving chemical that stays on top, a water layer 7 exists that stays on the bottom the tank 5. Adding additional water will help most, or all of the lignin dissolving solvent to evaporate in less time, but also requires more water to be evaporated, condensed, and collected in tank 5.

The separated poly lignin 240 of FIG. 2 may be used as described herein, and in one alternative, the poly lignin may be further mixed with one or more polymers to form a portion of a polymer or plastic object, such as some house hold plastic for example, or a smaller amount of lignin may be mixed with a polymer and used as a colorant in a plastic object. In one form, about 1-50% lignin may be co-injected, co-extruded, or compounded with other polymers as an additive or as a filler. In another form, about 0.01-5% lignin may be mixed with polymers as a colorant to provide a light tan to a dark brown color for polymers such as polypropylene for example. Other polymers are contemplated.

The poly lignin 240 is in liquid form in room temperature when it is mixed or dissolved in lignin dissolving solvent, and as the lignin dissolving solvent is removed from the mixture, it becomes thicker until it becomes completely solid at room temperature. Depending on the biomass resource, the separated poly lignin 240 of FIG. 2, is usually in a solid form at room temperature when it is mixed with less than 10% lignin dissolving solvent. For example, at room temperature poly lignin obtained from southern yellow pine with about 4% lignin dissolving solvent is in solid form but can be formed slowly by hand into any desirable shape, and any further cooling down from the room temperature can help to preserve the obtained shape. When the lignin dissolving solvent is removed from poly-lignin obtained from southern yellow pine to a level of less than 2%, the poly lignin becomes completely solid and brittle like glass and any additional forming process requires additional thermal energy to soften it first.

Figure 5:
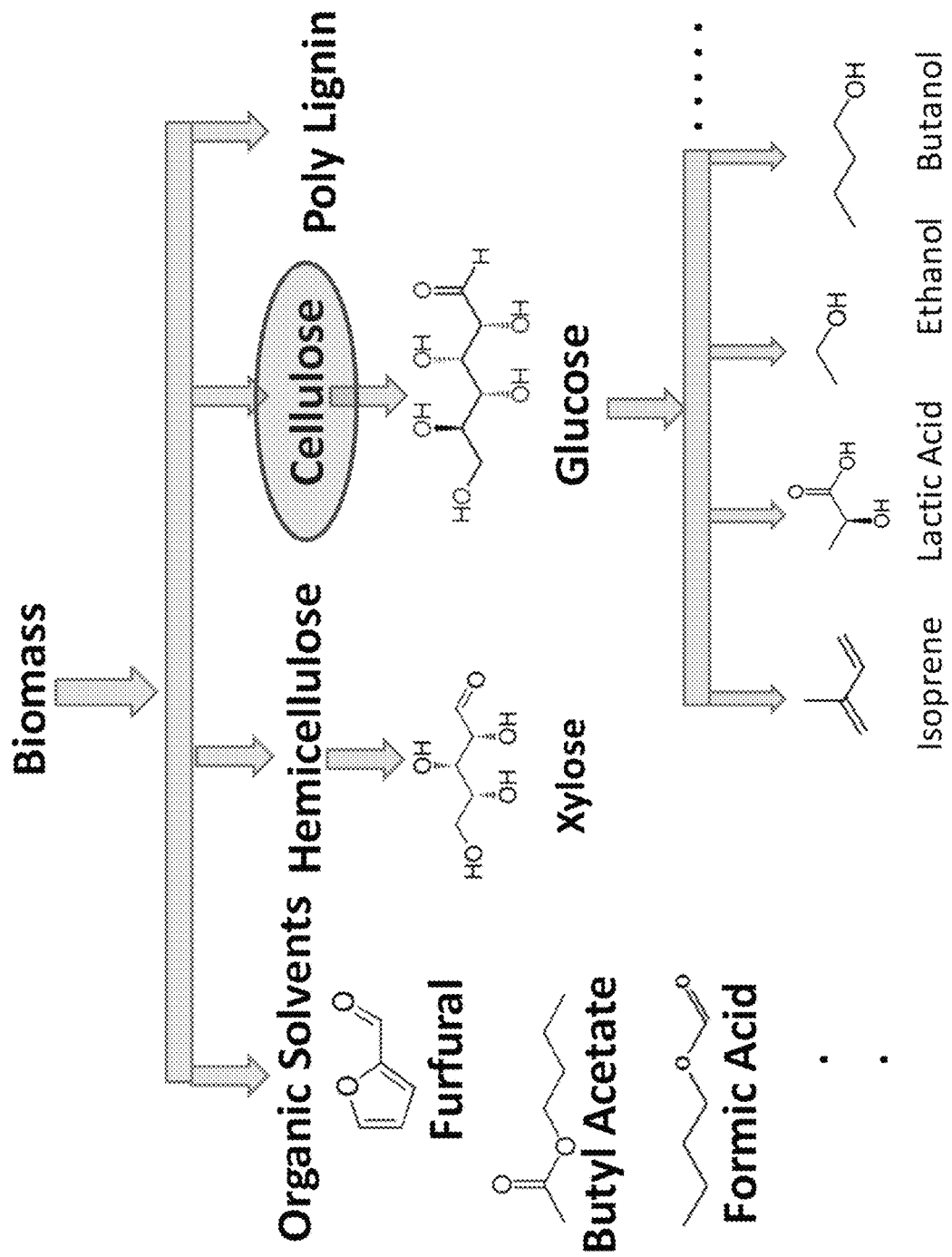
FIG. 5 is a schematic diagram showing some of the core products and chemicals produced from the process described herein.

Referring now to FIG. 5, the following is a more detailed description of a number of products produced by the process described herein. In one example form, the basic four intermediary products produced by the process includes: organic solvent, poly lignin, cellulose, and hemicellulose/xylose. The organic solvent may include acetic acid, butyl acetate, furfural, formic acid butyl ester, etc. Butyl acetate may be processed further to manufacture synthetic fruit flavoring. Furfural is a chemical intermediate used to produce furfural alcohol for furan resins. Formic acid butyl ester may be used as preservative and antibacterial agent in livestock feed, and all of them individually, together, or as a mixture with other lignin dissolving solvents, may be used as part of the recyclable solvent for the fractionation process. Other details of the major organic materials produced during catalyst free organosolv process, if butanol is used as part of the initial lignin solvent, are as follows:

Acetic Acid Butyl Ester
  Other names: Butyl Acetate, Butyl ethanoate, acetic acid, n-butyl ester.
  Formula: C6H12O2
  Structure:

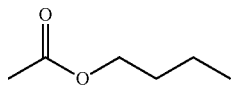

Furfural
  Other names: furan-2-carbaldehyde, furfural, furan-2-carboxaldehyde, fural, furfuraldehyde, 2-furaldehyde, and pyromucic aldehyde.
  Formula: C5H4O2
  Structure:

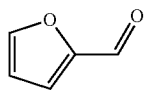

Formic Acid Butyl Ester
  Other names: n-Butyl formate; Butyl formate; HCOO(CH2)3CH3; n-Butyl methanoate; Butyl methanoate; Butylester kyseliny mravenci.
  Formula: C5H10O2
  Structure:

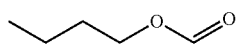

Acetic Acid:
  Other names: ethanoic acid
  Formula: C2H4O2 Structure:

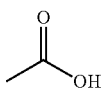

The following observations were also made:
1) Application of a catalyst free organosolv process produces more pulp yield with a larger KAPPA number.
2) A catalyst free organosolv process produces other bio chemical products such as formic acid, butyl acetate, furfural, etc. which are similar to traditional organosolv processes with a catalyst, but in lesser amounts.

CONCLUSION

Various modifications and variations can be made in the present invention without departing from the spirit or scope of the invention.

From the foregoing, it will be seen that this invention is one well adapted to obtain all the ends and objects herein set forth, together with other advantages which are obvious and which are inherent to the structure.

It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

The invention claimed is:

1. A catalyst free organosolv process for producing bio-products by fractionating and decomposing lignocellulosic materials comprising:
  A) providing an initial solvent comprising a quantity of water and a quantity of lignin dissolving chemicals selected from the group consisting of alcohols, esters, furans, and combinations thereof; and
  B) placing the initial solvent in contact with a quantity of lignocellulosic biomass in an autoclave-type environment and keeping the mixture at a process temperature during a process time, thereby dissolving at least a portion of the lignin and hemicellulose present in the biomass and forming a solvent soluble phase or spent or used solvent, and a solvent insoluble phase or pulp;
  wherein no acid catalyst is added to the lignocellulosic biomass; and
  wherein the catalyst free organosolv process produces at least one organic acid in step (B) that is present in the solvent soluble phase or spent or used solvent, whereby the catalyst free organosolv process is acidic.

2. The process of claim 1 wherein the spent solvent comprises an organic materials portion that also includes water insoluble lignin, and an aqueous material portion that can be separated from each other.

3. The process of claim 2 further comprising reusing at least a part of the spent solvent as an initial solvent and placing it in contact with more biomass.

4. The process of claim 2 further comprising reusing at least a part of the separated organic portion of the spent solvent as part of an initial solvent and placing it in contact with more biomass.

5. The process of claim 2 further comprising reusing at least a part of the separated aqueous portion of the spent solvent as part of an initial solvent and placing it in contact with more biomass.

6. The process of claim 1 wherein the solvent insoluble phase is removed and used as pulp.

7. The process of claim 2 further comprising a separation of dissolved solid from the organic portion of the spent solvent by some means such as evaporation and condensation of the liquid part, to recycled lignin dissolving solvent for future use.

8. The process of claim 7 further comprising using at least a part of the recycled lignin dissolving solvent as initial lignin dissolving solvent for more fractionation of biomass, with or without pH adjustment by addition of a base to the recycled dissolving solvent.

9. The process of claim 2 further comprising a separation of dissolved solid from the aqueous portion of spent solvent by some means such as evaporation and condensation of the liquid to form recycled water.

10. The process of claim 9 further comprising using at least a part of the recycled water as initial lignin dissolving solvent for more fractionation of biomass, with or without pH adjustment by addition of a base to the recycled dissolving solvent.

11. The process of claim 1 wherein the biomass is impregnated with fresh, spent, or recyclable lignin dissolving solvent with or without pH adjustment prior to catalyst free organosolv processes.

12. The process of claim 1 wherein the biomass is impregnated with extra fresh, used, or recyclable water with or without pH adjustment prior to catalyst free organosolv process.

13. The process of claim 1 wherein the biomass is impregnated with fresh, used, or recyclable solvent comprising of both water and lignin dissolving solvent prior to catalyst free organosolv processes.

14. The process of claim 1 wherein the initial solvent is comprised of
A) A quantity of water comprising of a mixture of any percentage of fresh water, used aqueous layer, recyclable water, or any combination of them, with or without pH adjustment; and
B) A quantity of lignin dissolving chemicals comprising of a mixture of any percentage of fresh, used, recyclable organic layer, or any combination of them, with or without pH adjustment.

15. The process of claim 1 further comprising contacting the solvent with the biomass in an inert atmosphere or in an oxidizing atmosphere, or in a reducing atmosphere depending on expected results.

16. The process of claim 1 wherein the biomass comprises of dry lignocellulosic material provided at a 1 to 5 ratio, or higher with the solvent.

17. The process of claim 1 further comprising increasing production of at least butyl acetate by increasing the process temperature.

18. The process of claim 1 further comprising of the application of some type of agitation or mixing that can increase potential contact between solid particles and liquid solvent during at least a part of the fractionation process.

19. The process of claim 1 further comprising increasing production of at least butyl acetate by keep recycling the solvent without any pH adjustment.

20. The process of claim 1 further comprising of increasing production of acetic acid by increasing process temperature and reducing process time.

21. A process for isolating poly lignin from spent lignin dissolving solvent produced by the method of claim 1, wherein the separation process comprises: solvent extraction, chromatography, distillation, filtration, pressing, recrystallization, and/or solvent-solvent partitioning using the separated liquor with or without pH adjustment as recyclable lignin dissolving solvent.

22. The process of claim 21 further comprising compounding or co-extruding a quantity of poly lignin with a quantity of one or more polymers to produce a polymeric object.

23. The process of claim 21 further comprising compounding or co-extruding a quantity of poly lignin with a quantity of one or more polymers as a colorant for a polymeric object.

24. The process of claim 21 further comprising leaving a percentage of lignin dissolving solvent in poly lignin to make a formable solid at room temperature that can maintain its form at lower temperatures.

25. The process of claim 21 further comprising removing most of lignin dissolving solvent from the used lignin dissolving solvent to make a sustainable solid form of poly lignin at room temperature.

26. The process of claim 21 further comprising using extra water or recyclable aqueous layer during a distillation process to further drive lignin dissolving solvent out of poly lignin.

* * * * *